Figure 1:
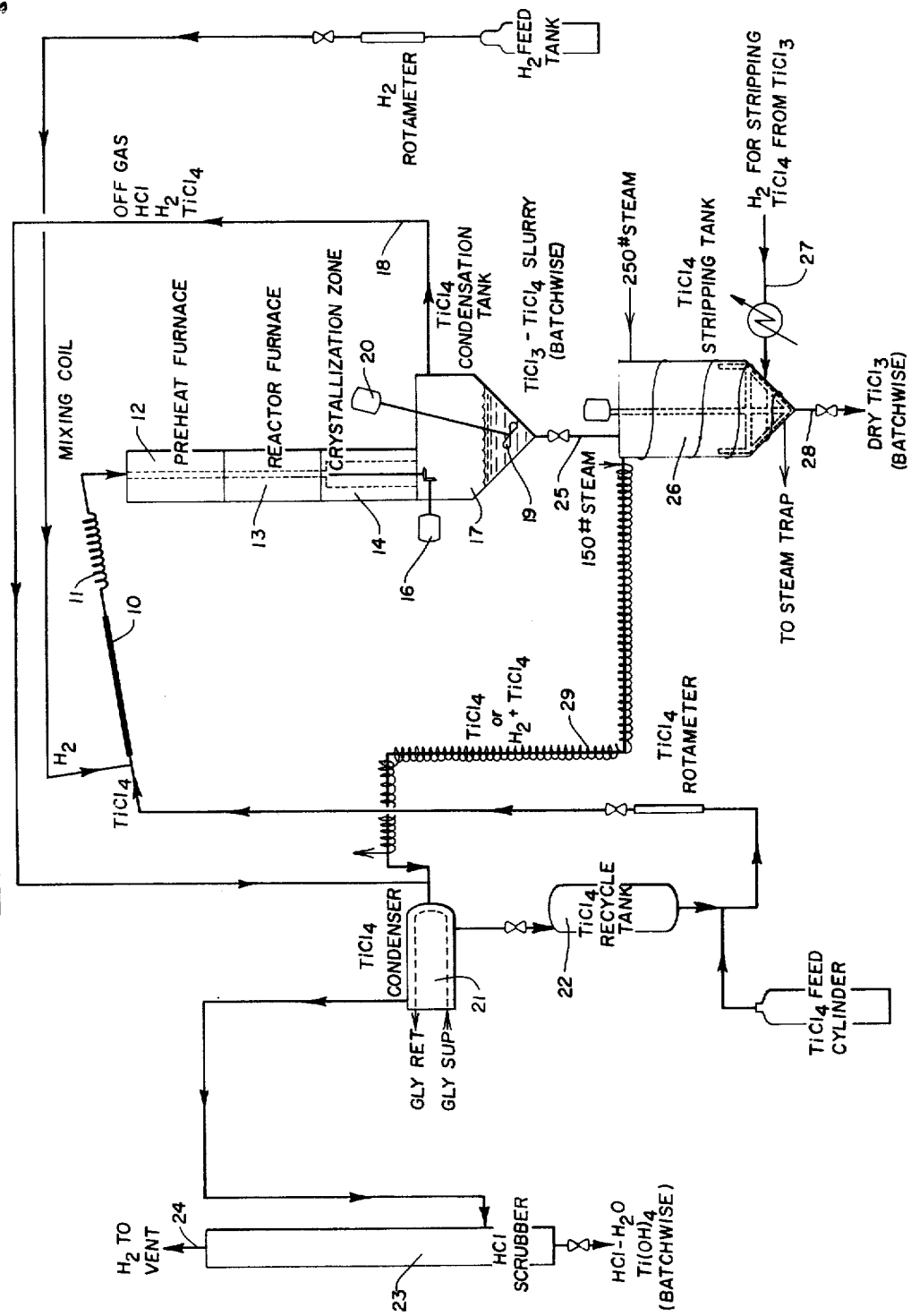

United States Patent [19]
Laffitte

[11] 3,891,746
[45] June 24, 1975

[54] PROCESS FOR PREPARING ALPHA-TRICHLORIDE PARTICLES

[75] Inventor: Royce D. Laffitte, Longview, Tex.

[73] Assignee: Eastman Kodak Company, Rochester, N.Y.

[22] Filed: July 30, 1973

[21] Appl. No.: 383,637

[52] U.S. Cl. .................................. 423/492; 423/76
[51] Int. Cl. ............................................. C01g 23/02
[58] Field of Search .................... 423/492, 76, 75

[56] References Cited
UNITED STATES PATENTS 3,078,144   2/1963   Bown et al. ..................... 423/492

FOREIGN PATENTS OR APPLICATIONS 1,087,573   8/1960   Germany ....................... 423/492
1,142,159   1/1963   Germany ....................... 423/492
1,164,998   3/1964   Germany ....................... 423/492

OTHER PUBLICATIONS

Chemical Abstracts, Vol. 52, 1958, Col. 15183.

Primary Examiner—Edward Stern

[57] ABSTRACT

A process is disclosed for preparing hydrogen reduced titanium trichloride having an average particle size greater than 20 microns.

8 Claims, 5 Drawing Figures

PROCESS FOR CONTINUOUS PRODUCTION OF TITANIUM TRICHLORIDE

PROCESS FOR CONTINUOUS PRODUCTION OF TITANIUM TRICHLORIDE

DETAIL OF PREHEAT FURNACE-REACTOR CRYSTALLIZATION ZONE IN THE TITANIUM TRICHLORIDE PROCESS

CONVERSION OF $TiCl_4$ TO $TiCl_3$ VERSUS FEED MOLE RATIO

CONVERSION OF $TiCl_4$ VERSUS REACTION TEMPERATURE (°C)

REPRESENTATIVE PARTICLE SIZE OF $TiCl_3$ PRODUCE VERSUS MOLE % $TiCl_3$ IN REACTOR EFFLUENT VAPOR (CRYSTALLIZATION ZONE TEMPERATURE ALWAYS 140°C)

PROCESS FOR PREPARING ALPHA-TRICHLORIDE PARTICLES

This invention relates to a process for preparing titanium trichloride. One aspect of this invention concerns a process for preparing titanium trichloride by reducing titanium tetrachloride. Another aspect of this invention concerns a process for preparing hydrogen reduced titanium trichloride having an average particle size greater than 20 microns.

Titanium trichloride is widely used as a component of stereospecific catalyst and particularly in the catalyst used in the stereospecific polymerization of propylene. One form of titanium trichloride used in such polymerizations is the violet alpha form of titanium trichloride. It is known that titanium tetrachloride can be reduced to form the violet alpha form of titanium trichloride by reacting the titanium tetrachloride with hydrogen at temperatures in the range of 800° to 1200°C. In recovering the reduced titanium trichloride there is considerable prior art which discloses recovering the titanium trichloride in the smallest particle size. The smallest particle size titanium trichloride is necessary in some polymerization processes to provide a catalyst having the greatest reactivity. However, in the solution polymerization of propylene the particle size of the titanium trichloride used in the catalyst composition, particularly in lithium containing catalysts, affects the amount of crystalline polypropylene produced (i.e., a particle size greater than 20 microns produces more crystalline polymer).

In the polymerization of propylene with stereospecific catalysts both a crystalline and amorphous portion are formed. It is desirable to minimize the amount of amorphous polymer formed. Therefore, it is apparent that it would be an advance in the state of the art to provide a process for preparing hydrogen reduced titanium trichloride having an average particle size greater than 20 microns.

Accordingly, it is one of the objects of the present invention to provide a process for preparing large particle size titanium trichloride.

A further object of the invention is to provide a process for the hydrogen reduction of titanium tetrachloride to form titanium trichloride.

Still another object of this invention is to provide a process for preparing hydrogen reduced titanium trichloride having an average particle size greater than 20 microns.

Another and further object of the invention is to provide a hydrogen reduced titanium trichloride having an average particle size greater than 20 microns which is particularly useful as a catalyst component in lithium containing stereospecific catalyst used for solution polymerization of propylene and higher alpha-monoolefins.

Further objects and advantages of this invention will be apparent to those skilled in the art from the accompanying disclosure and claims.

In accordance with this invention, a process is provided for producing alpha-titanium trichloride particles having an average particle size greater than 20 microns. The process comprises heating an admixture of hydrogen and titanium tetrachloride and passing the heated mixture through a reaction zone at a temperature within the range of about 800°C. to about 1200°C., and thereafter passing the reactor effluent directly into a crystallization zone maintained at a temperature of not less than 120°C. or more than 500°C. in the absence of any quenching medium. The ratio of hydrogen to titanium trichloride in the reactants and the reaction temperature are regulated such that the reactor effluent entering the crystallization zone contains at least 1.75 mole percent titanium trichloride vapor. The temperature in the crystallization zone being within the range of above the dew point of titanium trichloride and below the sublimation temperature of titanium trichloride and regulated such that predominantly heterogeneous nucleation of titanium trichloride occurs. The dew point of titanium trichloride is about 136°C. When titanium trichloride is mixed with hydrogen, the partial pressure of the hydrogen-titanium trichloride mixture reduces the dew point of the titanium trichloride proportionally to the amount of hydrogen present. Under the reaction conditions of the present invention the amount of hydrogen present in the mixture lowers the dew point of titanium trichloride to a temperature of about 120°C. The crystallization zone has a mechanical means to continuously remove the solid titanium trichloride from the inner surface of the crystallization zone. The solid titanium trichloride passes into a separation zone wherein solid titanium trichloride is separated from other reactor effluents.

Referring to FIG. 1, one process for preparing titanium trichloride having an average particle size greater than 20 microns is shown whereby hydrogen and titanium tetrachloride at a molar ratio of 1.87 to 1 are fed into a vaporizer 10 maintained at a temperature of 136–140°C. by electrical heated tape or other conventional heating means, not shown, where the titanium tetrachloride is vaporized and the hydrogen preheated. The temperature can be measured by a thermocouple or other conventional heat measuring means, not shown. One such vaporizer can be, for example, a one inch pipe wrapped with electric heated tape or other conventional heating means. From the vaporizer the hydrogen-titanium tetrachloride gaseous mixture passes through a mixing coil 11 where the mixture is further heated to a temperature of approximately 300°C. The mixing coil can be, for example, made from 5 feet of ¼ inch stainless steel 304 tubing. From the mixing coil the hydrogen-titanium tetrachloride mixture passes into the preheat furnace 12 where it is heated to approximately 900° to 1000°C. From the preheat furnace the heated mixture passes into reactor furnace 13. The temperature in the reactor furnace is maintained at 900° to 1000°C. and approximately 6 to 10 mole percent of the titanium tetrachloride is converted to titanium trichloride with a reactor residence time of about 0.565 second. The preheat furnace, reactor and crystallization zone are shown in more detail in FIG. 2.

Figure 2:
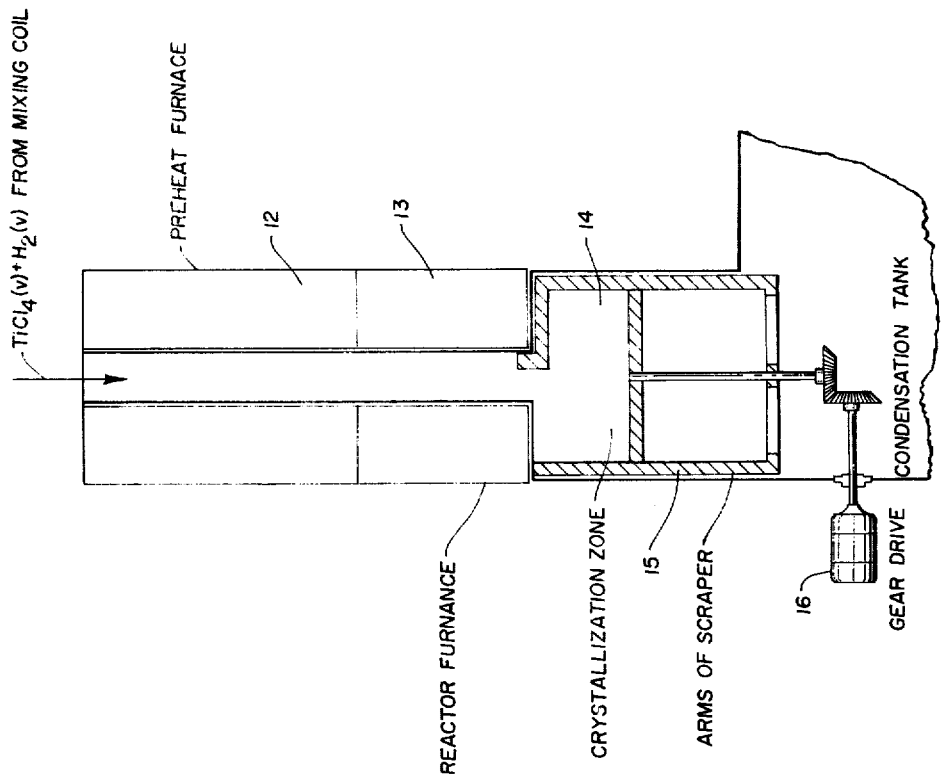

The reactor effluent passes into the crystallization zone 14 where the titanium trichloride crystallizes. The crystallization zone wall temperature is maintained at about 150°C. or higher. A planar mechanical scraper 15, shown in end view in FIG. 1 and side view in FIG. 2, is used in the crystallization zone to scrape the inner surfaces of the crystallization zone and prevent titanium trichloride buildup on the inner surfaces of the crystallization zone. The scraper is driven by motor means 16 rotationally within the crystallization zone.

From the crystallization zone the crystalline titanium trichloride together with the other reactor effluents passes into the titanium tetrachloride condensation tank 17, as shown in FIG. 1, operated at essentially ambient temperature where the majority of titanium tetrachloride is condensed by cooling. The condensing titanium tetrachloride droplets scrub the solid titanium trichloride particles from the noncondensable gases. The liquid titanium tetrachloride and solid titanium trichloride may be stirred with stirrer 19 driven by motor 20 or agitated to keep the materials in a slurry form for ease in transferring these materials from the condensation tank. The hydrogen together with some titanium tetrachloride and hydrogen chloride exits the tank through line 18 and passes through a titanium tetrachloride condenser 21 where the titanium tetrachloride is condensed by cooling with a cooling means such as glycol, and returned to the titanium tetrachloride recycle tank 22. The hydrogen and hydrogen chloride then enter the hydrochloric acid scrubber 23 where hydrogen chloride is removed by water scrubbing. The excess hydrogen is vented through line 24.

The titanium trichloride-titanium tetrachloride slurry in the titanium tetrachloride condensation tank is passed through line 25 into the titanium tetrachloride stripping tank 26 where the majority of titanium tetrachloride is removed by vaporization by heating as by the use of steam in a steam jacket around the stripping tank, for example. Hydrogen gas at 200°C. through line 27 is then used to strip the remaining titanium tetrachloride from the titanium trichloride until the residual titanium tetrachloride content is less than 200 ppm. A stirring and scraping means may be used to scrape the titanium trichloride from the lower portion of the stripping tank and keep the material in a moving condition for ease in removing the titanium trichloride from the tank. The dry titanium trichloride product substantially free of impurities is removed from the stripping tank through line 28 and packaged. The off gas from the stripping tank passes through line 29 to the titanium tetrachloride condenser 21 where titanium tetrachloride is condensed and returned to the titanium tetrachloride recycle tank 22. The process for continuous production of titanium trichloride is operated at essentially atmospheric pressure; however, higher pressures may be used if desired.

The hydrogen to titanium tetrachloride feed mole ratio can vary from about 0.5 to 1 to about 10 to 1 and the particular ratio used depends on such interrelated factors as the reaction temperature, conversion of titanium tetrachloride to titanium trichloride realized, concentration of titanium trichloride vapor in the reactor effluent, and loss of titanium tetrachloride in noncondensable gases that are vented from the process.

Figure 3:
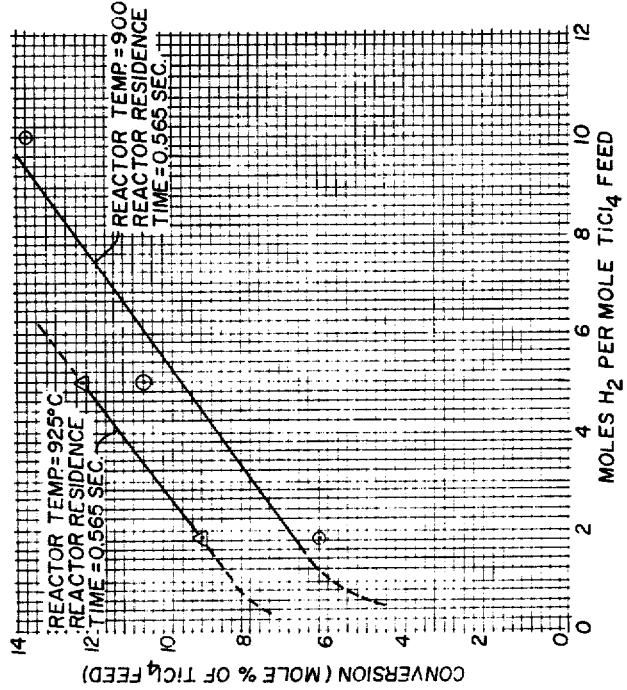

The effect of the hydrogen to titanium tetrachloride feed mole ratio on the equilibrium conversion of titanium tetrachloride is shown in FIG. 3 and as can be seen the conversion increases as the feed mole ratio increases. Although it is normally desirable to increase conversion, the effect of higher hydrogen to titanium tetrachloride feed mole ratios on other process parameters must be considered. For example, the concentration of titanium trichloride vapor in the reactor effluent entering the crystallization zone is critical and must be at least about 1.75 mole percent in order to produce the desired large particle size titanium trichloride. Although conversion of titanium tetrachloride increases with higher feed mole ratios, the concentration of titanium trichloride in the reactor effluent decreases. Also, titanium tetrachloride, because of its vapor pressure, will be lost in the noncondensable gases that are vented from the process. Since hydrogen feed is the main source of noncondensable gas, lower feed ratios increase the efficiency of the titanium tetrachloride recovery system. In view of these factors it is desirable to operate at hydrogen to titanium tetrachloride feed mole ratios of 5 to 1 or lower, preferably 2 to 1 to 1.0 to 1, most preferably 1.9 to 1 to 1.8 to 1.

Figure 4:
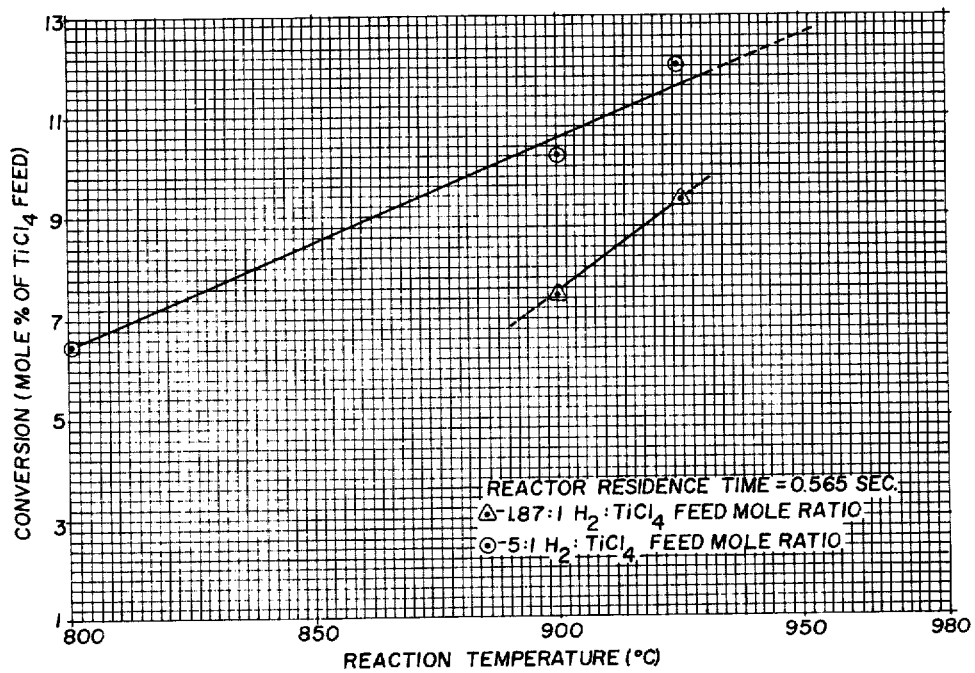

The reaction temperature is within the range of about 800°C. to about 1200°C. and it is desirable to operate at as high a temperature as possible due to the increase in conversion of titanium tetrachloride with increasing reaction temperature as shown in FIG. 4. However, in a commercial process it is desirable for economic reasons to maintain the reaction temperature in the range of about 900°C. to 1000°C., most preferably 925°C. to 950°C. One reason for maintaining the temperature in this range is that at this temperature the apparatus used in the practice of this invention such as the preheat furnace-reactor furnace-crystallization zone apparatus, can be made from Hastelloy C and Inconel 600 metal. At temperatures about 1000°C. it is necessary to use more expensive materials such as, for example, ceramics.

The design and operation of the crystallization zone should be such that the reactor effluent is allowed to cool by conventional heat transfer to a temperature not less than about 120°C. in order to produce the desired large particle size titanium trichloride. Rapid quenching of the reactor effluent will result in extremely fine particles of titanium trichloride. Consequently, the introduction of a quench gas or titanium tetrachloride liquid into the crystallization zone should be avoided. The crystallization zone must also be equipped with means to remove the solid titanium trichloride to prevent plugging. The inner surface of the crystallization wall temperature can be varied from about 120°C. to about 475°C., preferably about 135°C. to 200°C. without significantly affecting the particle size of titanium trichloride produced.

Figure 5:
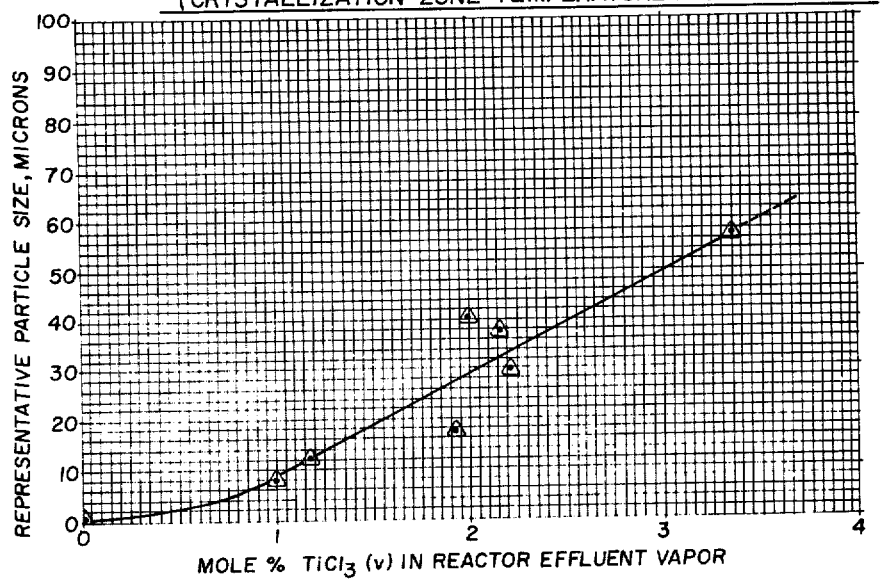

As previously pointed out, the majority of titanium trichloride particles produced by the process of this invention are larger than 20 microns, preferably greater than 20 to 100 microns, most preferably 40 to 75 microns. The size of the particles is determined by the rate of cooling of the titanium trichloride vapor in the crystallization zone and the concentration of titanium trichloride vapor in the reactor effluent entering the crystallization zone. The effect of the concentration of titanium trichloride vapor in the reactor effluent on the particle size of the titanium trichloride produced is shown in FIG. 5 and as can be seen the particle size increases as the concentration of titanium trichloride vapor increases.

Titanium trichloride particle size is determined as follows:

1. A 0.05 gram sample of titanium trichloride is suspended in 20 drops of dry mineral oil.

2. A photomicrograph at 100X magnification with a scale superimposed is made of the mineral oil-titanium trichloride slurry prepared in Step 1 above.

3. Particle size range is obtained by measurement of the largest and smallest particle in the photomicrograph using the superimposed scale.

4. The particle size of the majority of the particles is then determined by measurement of the particles in the photomicrograph using the superimposed scale.

In the process of this invention we have found that the conversion of titanium tetrachloride must be such that a titanium trichloride vapor concentration of at least about 1.75 mole percent is obtained in the reactor effluent. Also the crystallization zone and reaction zone must be located such that no solid titanium trichloride is formed in the reactor effluent prior to entry into the crystallization zone. As the reactor effluent cools by conventional heat transfer in the crystallization zone, titanium trichloride crystallizes. Predominately heterogeneous nucleation occurs in the crystallization zone. Rapid cooling by a quench gas or liquid titanium tetrachloride would cause homogeneous nucleation which would produce very small particles of titanium trichloride.

As previously pointed out, to prevent plugging by titanium trichloride, mechanical means such as the scraper in FIG. 2 must be incorporated in the crystallization zone to continuously remove the titanium trichloride. Therefore, due to the high temperature of the reactor effluent, it is preferable that the scraper is supported and driven from the bottom of the crystallization zone. Temperatures in the process of this invention can be measured by thermocouples or other conventional temperature sensing means.

This invention can be further illustrated by the following examples of preferred embodiments thereof, although it will be understood that these examples are included for purposes of illustration and are not intended to limit the scope of the invention unless otherwise specifically indicated.

EXAMPLE 1

Titanium trichloride is produced by the process shown in FIG. 1 as follows:

Technical grade liquid titanium tetrachloride is fed at a rate of 2.42 cubic centimeters per minute to the titanium tetrachloride vaporizer. High purity hydrogen is fed from a cylinder into the entrance of the titanium tetrachloride vaporizer at a rate of 995 standard cubic centimeters per minute. The mixing coil is heated to approximately 371°C. The exit preheat temperature is 925°C. and the exit reactor temperature is 925°C. The top half of the crystallization zone temperature is 370°C., the bottom half temperature is 260°C. A titanium tetrachloride conversion of 8.7 percent is obtained. The particle size of the titanium trichloride produced is 1 to 100 microns with 80 percent 25 to 60 microns in diameter. The titanium trichloride vapor concentration in the reactor effluent is 2.3 mole percent.

EXAMPLE 2

Example 1 is repeated except that hydrogen at a temperature of 200°C. is introduced as a quench gas into the crystallization zone. The particle size of the titanium trichloride produced is less than 5 microns.

EXAMPLE 3

Example 1 is repeated except that the hydrogen to titanium tetrachloride feed mole ratio is adjusted such that the mole percent titanium trichloride vapor in the reactor effluent varies. The effect on the particle size of the titanium trichloride produced is shown in FIG. 5.

EXAMPLE 4

A catalyst prepared from lithium butyl, triethyl aluminum and titanium trichloride is prepared according to Example 1 of U.S. Pat. No. 3,679,775. The catalyst contains lithium butyl, triethyl aluminum and titanium trichloride in a mole ratio of 1/2:1/2:1. The titanium trichloride has an average particle size of 10 microns. The catalyst mixture is charged to a dry 2-liter stirred stainless steel autoclave with 850 ml. of mineral spirits. The autoclave is sealed, purged with propylene and heated to 160°C. Propylene is pumped into the autoclave to 1000 psi and the reaction continued for 3 hours. The autoclave is cooled and vented. The polypropylene recovered from the reaction has a hexane index of 70.5 percent (percent normal-extractable with normal hexane at reflux) and an inherent viscosity of 1.66 (determined in tetralin at 145°C.).

EXAMPLE 5

Example 4 is repeated except that the titanium trichloride is a hydrogen reduced titanium trichloride having an average particle size of 5 microns. The polypropylene recovered has a hexane index of 68 and an inherent viscosity of 1.56.

EXAMPLE 6

Example 4 is repeated except that the titanium trichloride is a hydrogen reduced titanium trichloride having an average particle size greater than 20 microns. The polypropylene recovered has a hexane index of 77.8 and an inherent viscosity of 1.87.

Examples 4, 5 and 6 show that the titanium trichloride of the present invention provides an increase in hexane index or crystallinity and provides polymer having a higher molecular weight.

The invention has been described in considerable detail with particular reference to preferred embodiments thereof, but it will be understood that variations and modifications can be effected within the spirit and scope of the invention.

I claim:

1. A process for producing alpha-titanium trichloride particles wherein at least a majority of said particles have an average particle size greater than 20 microns which comprises passing a mixture of hydrogen and titanium tetrachloride at a mole ratio of 0.5 to 1 to 10 to 1 through a reaction zone at a temperature within the range of about 800°C. to about 1200°C. and thereafter passing the reactor effluent into a crystallization zone in the absence of any quenching medium, the ratio of hydrogen to titanium tetrachloride in the reactants and the reaction temperature being regulated such that said reactor effluent entering said crystallization zone contains at least about 1.75 mole percent titanium trichloride vapor, the temperature in said crystallization zone being within the range of above the dew point of titanium tetrachloride and below the sublimation temperature of titanium trichloride and regulated such that predominately heterogeneous nucleation of titanium trichloride occurs, and thereafter recovering the crystallized titanium trichloride having an average particle size greater than 20 microns and up to 100 microns.

2. A process according to claim 1 wherein said mixture of hydrogen and titanium tetrachloride passing through said reaction zone is at a mole ratio of 2.0 to 1 to 1.0 to 1.

3. A process according to claim 2 wherein said reaction zone temperature is 900° to 1000°C.

4. A process according to claim 3 wherein the temperature of said crystallization zone is 120°C. to 475°C.

5. A process according to claim 4 wherein said mixture of hydrogen and titanium tetrachloride passing through said reaction zone is at a mole ratio of 1.9 to 1 to 1.8 to 1.

6. A process according to claim 5 wherein said reaction zone temperature is 925°C.

7. A process according to claim 6 wherein the temperature of said crystallization zone is 150° to 200°C.

8. A process according to claim 1 wherein said particle size is 40 to 75 microns.

* * * * *